May 3, 1949.    H. M. STEELE    2,469,283
FENDER DOOR LOCK

Filed Jan. 30, 1947    2 Sheets-Sheet 1

Fig. I.

Inventor
Homer M. Steele

By *Clarence A. O'Brien*
and *Harvey B. Jacobson*
Attorneys

May 3, 1949. H. M. STEELE 2,469,283
FENDER DOOR LOCK
Filed Jan. 30, 1947 2 Sheets-Sheet 2

Inventor
Homer M. Steele
By Clarence A. O'Brien
and Harvey B. Jacobson
Attorneys Patented May 3, 1949

2,469,283

UNITED STATES PATENT OFFICE 2,469,283

FENDER DOOR LOCK

Homer M. Steele, Ashland, Ky.

Application January 30, 1947, Serial No. 725,326

4 Claims. (Cl. 292—201)

1

This invention relates to a fender door lock designed to be used in connection with doors on fenders of automobiles to close an opening therein through which access is had to the usual tank filling neck and cap for the gasoline tank under the rear portion of the body floor or trunk compartment thereof, the present invention being adapted to lock the door in a closed position to prevent access to the cap and filling neck of the tank but adapted to be opened by release of the lock from within the automobile, by the driver or chauffeur at the instrument panel or dash merely by operating a switch to close a circuit to an electrical door release means for the lock connected in circuit with the battery and with the ignition switch so that the lock is released upon turning on the ignition and operating the switch, to permit the door to open without getting out of the car, when it is desired to purchase gasoline so that the attendant can obtain access to the cap and neck of the tank while spurious or unwarranted access thereto is prevented.

The object of the invention is to provide a fender door lock which automatically locks the door in a closed position and which may be released electrically from the instrument panel or dash by the driver without alighting from the car, and which includes means for automatically opening the door to a raised position to uncover the fender opening, filling neck and cap to permit the gas tank to be filled in purchasing gasoline, after which the door is closed by the attendant at the gas station, and automatically assumes a locked position and against access except at the will of a person possessing a key to the ignition switch, thus preventing pilfering of the cap or gasoline.

Other objects and advantages reside in the details of construction and operation as more fully hereinafter described and claimed, reference being had to the accompanying drawings forming part hereof, wherein like numerals refer to like parts throughout, and in which:

2

Figure 2:
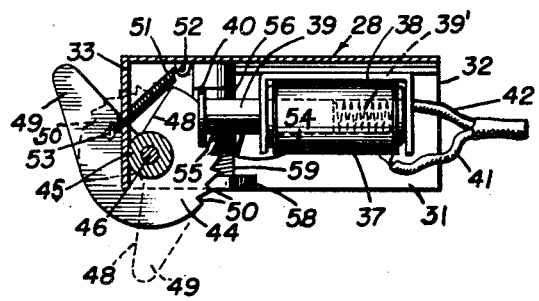
Figure 2 is an enlarged detail sectional view showing the mounting of the fender door lock, the latter being in side elevation with the lock in full lines in a locking position and in dotted lines in a releasing position.
Figure 4:
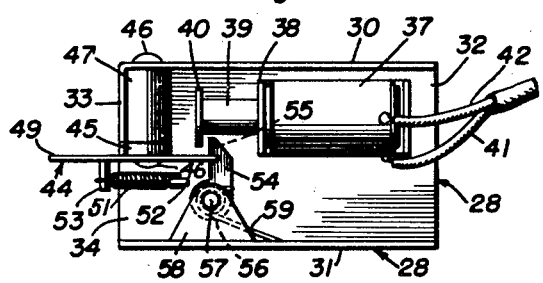
Figure 6:
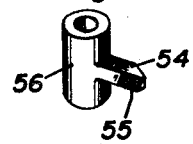
Figure 5:
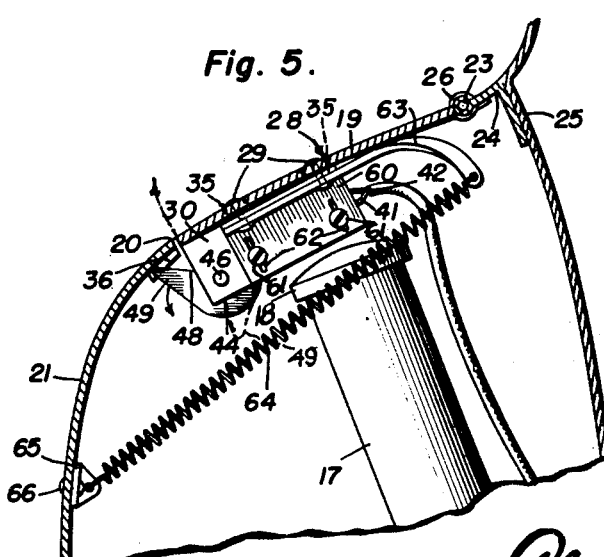

Figure 4 is a bottom plan view of the lock shown in Figure 2;

Figure 5 is an enlarged sectional elevation showing the lock applied to the fender door of an automobile over the filling neck and cap of a gasoline tank and in closed position, and Figure 6 is a detail perspective view of a locking pawl employed in connection with the lock.

Referring to the drawings in detail, in which like reference characters designate corresponding parts throughout the several views, 10 designates an automobile of the usual or improved design having the front seat 11, steering wheel 12, instrument panel or dashboard 13 having the usual key operated ignition switch 14 connected in circuit with the usual ignition battery 15 which also supplies current to the lights, and in which circuit is interposed a switch 16 of the push-button or any other suitable variety which will only operate to close the circuit when the ignition switch is on. Thus, both the ignition switch and the switch 16 are adapted to be operated by the driver reposed on the driver seat in front of the steering wheel. The automobile is equipped with the usual gasoline tank under the floor of the car in rear thereof or beneath the rear trunk compartment and as usual, is provided with a filling neck 17 adapted to be closed by a cap 18. Access is had to the filling cap and neck for the purpose of replenishing the gasoline supply in the tank for operating the automobile, through a fender door 19 disposed to cover and uncover an opening 20 at the top of the rear fender 21 over the rear drive wheel 22 at either side of the car. The door 19 is hinged in the usual or any preferred way as indicated at 23 to a bracket or angular portion 24 of the fender 21 at its point of connection with the body 25 of the automobile, and the door may be provided at the hinge with a spring 26 coiled on the pintle thereof or otherwise, to open the door upwardly to a raised position to uncover the opening 20 and expose the filling neck 17 and cap 18, for the purpose of inserting the usual gasoline pump nozzle for replenishing the gasoline supply. The neck is normally closed by the cap, which may be of any suitable type, including the lock type, though an ordinary cap is preferable in view of the locking means of the present invention for the fender door.

The fender door lock of the present invention is indicated generally at 27 and comprises an angular or channel-shaped mounting plate 28 riveted or otherwise secured beneath the door 19 as indicated at 29 adjacent the free edge of the door constituting a hinged closure for the door opening 20, the bracket forming a housing for the locking mechanism having sides 30 and 31, while the back or inner end is open as at 32 and the front end is open except for an inturned portion or flange 33 extending downwardly and inwardly at one side, leaving the other side open as indicated at 34. The housing or bracket 28 at its top portion, which forms the intermediate connecting or bight portion of the channel, may be slotted as at 35 where it receives the attaching means 29, which may be bolts, rivets or otherwise, in order to permit accurate adjustment and mounting of the bracket and housing beneath the fender door or closure 19, to properly position the same with respect to the keeper or edge portion 36 of the fender 21 at the door opening 20. The lock 27 extends across the door or closure 19 from the hinge outwardly toward the free edge thereof intermediately the width of the door or closure to a point adjacent the free edge thereof in proper relation to the cap 18 of the filling neck 17 and over the same, and an electro-magnet or solenoid 37 is mounted by means of its bracket 38 adjustably or otherwise to the underside of the top of the housing or channel bracket 28 so that the movable core 39 forced by spring 39' projects outwardly from the electro-magnet or coil 37 and is provided with an outstanding shoulder or flange of annular formation at its outer end, as indicated at 40. The electro-magnet or coil 37 is connected by the conductors 41 and 42 to the battery 15 at one terminal thereof, and to the switch 16, which is in turn connected to the ignition switch 14 and the other terminal of the battery by a conductor 43 separate and apart from the ignition and lighting circuit.

Figure 1:
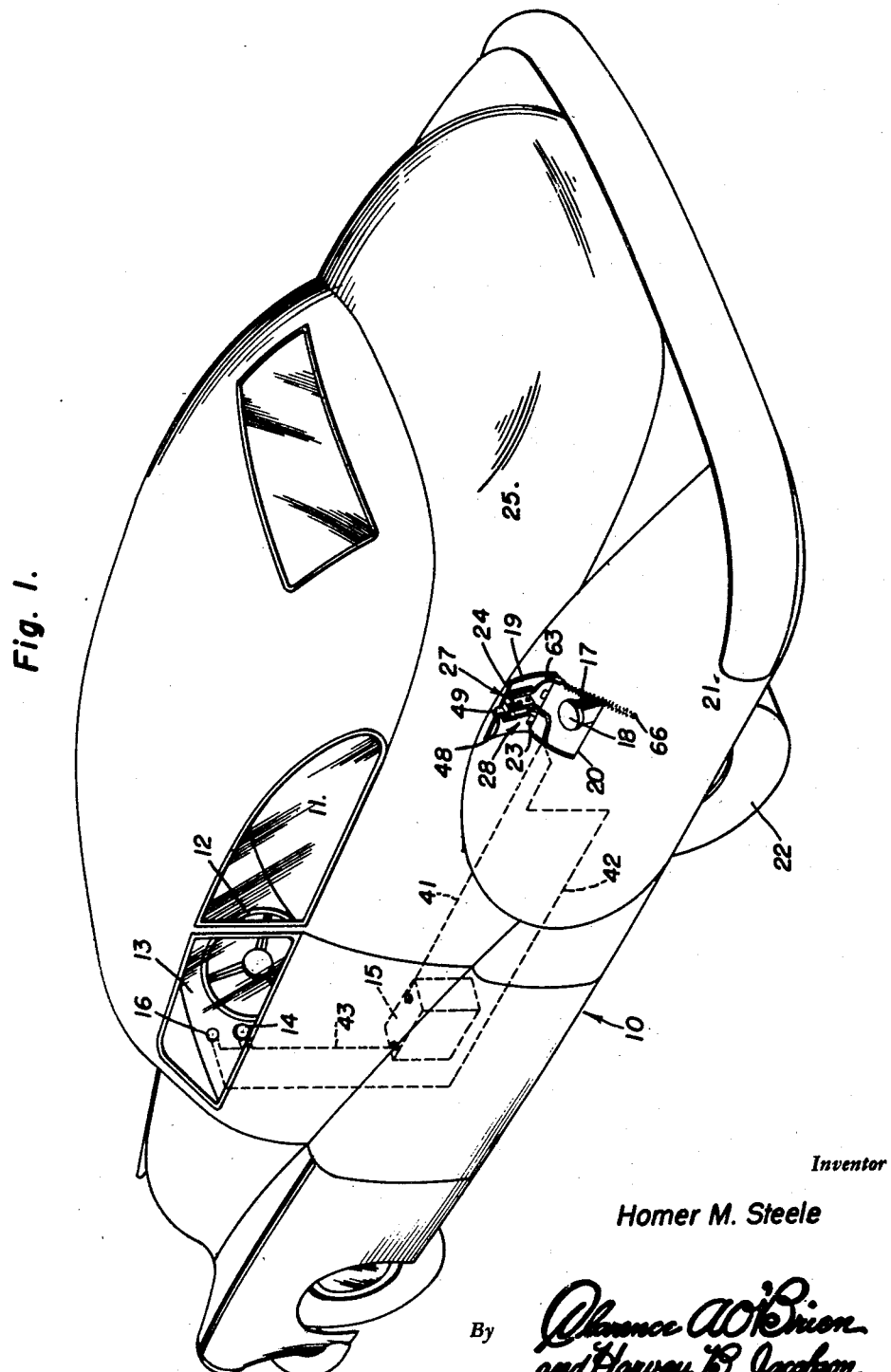
Figure 1 is a perspective view showing an automobile equipped with the improved fender door lock and showing the circuit arrangement for releasing the lock and with the fender door in an open position.

A latch plate or bolt 44 is provided with a central circular boss or bearing hub 45 pivoted on the axis 46 of a horizontal bearing sleeve 47 mounted in one corner of the bracket or housing 28 at the side 30 and adjacent inturned flange or front wall 33 in fixed position, by welding or otherwise so as to dispose the latch plate or bolt 44 vertically in position to turn at the inner end of the sleeve 47. The latch plate 44 is relatively circular and in the form of a disc, and is provided with a substantially right angular notch 48 in its peripheral edge, slightly less than a right angle, or in other words an acute angle and at one side of the notch, is provided with a projecting tapered finger 49 forming a vertically rockable latch. The diametrically opposite edge portion is provided with a series of ratchet teeth or notches 50 and a relatively weak spring 51 anchored at 52 to the top of the housing or bracket 28 and to a laterally projecting stud or pin 53 of the latch plate 44, exerts tension to bias the latch finger 49 to a locking position in connection with the keeper 36 on the fender adjacent the free edge of the door at the opening 20. It will be noted that the latch plate 44 is positioned parallel to the movable core 39 of the electro-magnet or solenoid and the notched edge thereof is adapted to be engaged by a pivoted catch finger 54 having a tapered end beveled at its engaging edge as indicated at 55, and formed intermediately on a bearing sleeve 56 which is vertically swiveled or mounted to turn on an axis 57 of a bearing bracket 58 extending in from the side wall 31 of the housing or bracket 28 adjacent the free end or shoulder 40 of the movable core 39 of the solenoid or electro-magnet so that the finger 54 extending radially from the hub or sleeve 56 is adapted to cooperate with and engage the serrations or notches 50 of the latch plate 44 at the back or inside and is held normally in engagement therewith by means of a spring 59 coiled on the pivot axis 57 and having one end engaging the housing at the wall 31 and the other end disposed around the back edge of the finger or catch 54 so as to exert tension normally holding the catch finger toward the edge of the latch plate 44 at the notches 50, and at right angles across the same. The tapered end of the finger 54 is also disposed behind or in back of the outstanding shoulder or annular flange 40 of the movable core 39 and both the latch plate and catch finger are adapted to rock on their pivots, so that the door 19 when opened, will trip the latch plate providing the finger 54 is disengaged from the notches 50, to swing down in the manner shown in Figures 2 and 5 of the drawings, so as to permit the latch plate to pass the keeper 36 at the edge of the body of the fender 21 at the door opening 20 so as to permit the door to swing to an open position as seen in Figure 1 of the drawings. This is accomplished by momentarily pressing the switch 16, which may be a pushbutton or other type of switch, to close the circuit to the electro-magnet or coil 37 to energize the latter, upon the key being inserted in the ignition switch 14 and turned on in the manner of a lock, thus causing movement of the core 39 by the energization, so that the outstanding shoulder or flange 40 will engage the catch finger 54 and release it from the notches 50, whereby the door or closure 19 will automatically swing to an open position, operated by the driver at the driver's seat. As soon as the door opens, switch 16 is released and catch finger 54 engages the latch plate to frictionally hold it in the dotted line position of Figure 2 against the action of spring 51. On the other hand, when the door is closed, the edge portion of the notch 48 opposite the finger 49 will automatically engage with the top of the fender 21 at the keeper 36, to trip the latch plate 44 and rock it backwardly or in the reverse direction so that the latch plate or bolt 44 will engage the keeper 36 beneath the fender portion 21 and lock the door in a closed position. As the switch 16 is now released or opened, and as the movable core 39 of the solenoid has moved to a released position, the latch plate will ratchet past the finger 54 and the latter will automatically engage in the proper one of the notches 50 of the latch plate 44, to effectively lock the latter against movement when brought to an engaging or locking position, thus preventing the fender door from being opened except by one authorized to do so, such as the driver possessing the ignition switch lock key. In this way, spurious access to and opening of the fender door and cap of the filling neck to the gas tank, is prevented while obviating the necessity of alighting from the car or moving from one's seat at the steering wheel, to open the door, to permit an attendant to fill the gasoline tank with gas. However, when the supply has been replenished, the cap 18, which may be used if desired, is simply applied to the neck and the door pressed down to a closed position to automatically engage and lock in such position until it is again desired to open the door by the operation of the switch 16, to energize the electro-magnet or coil and attract the armature or solenoid thereof for releasing the latch plate of the lock. Obviously, when the electro-magnet is energized, the catch finger 54 will be released from the locking member or latch plate so that the latter will be released from the bolted or locked position, but the mere act of closing the door will cause the latch to lock. It is important to note that the bolt or latch plate 44 is disposed edgewise at right angles to the keeper or body of the fender 21 at the door opening, and this gives considerable and excess strength over that required to hold the door in a locked closed position once it has been closed, thereby adding to its effectiveness by reason of the strength of the mounting.

Figure 3:
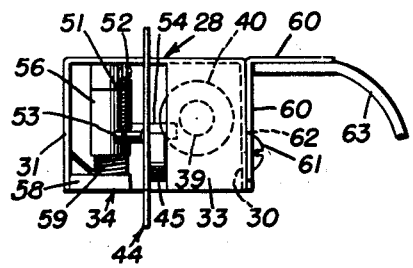
Figure 3 is a front elevation of the lock shown in Figure 2.

If desired, additional means or means separate and apart from the spring 26 tending to open the door or closure 19, may be provided. For this purpose, an angular bracket 60 is mounted against the side wall 30 of the housing or bracket 28, as by means of screws, bolts or other fastenings 61, and either the angular bracket plate 60 or the wall 30, may be slotted as indicated at 62, for permitting the necessary adjustment thereof on the housing in addition to the adjustment of the housing or bracket 28, which may serve as an adjustable mounting for the housing at the underside of the door or closure 19 instead of fastening through the housing or bracket 28. The angular bracket plate 60 is provided with a rearwardly and outwardly curved arm 63, the free curved end of which extends downwardly as clearly shown in Figures 3 and 5 of the drawings, for connection of a contractile coil spring or the like 64 therewith at one end, the opposite end of the spring being connected to a bracket ear 65 attached as at 66, to the fender 21 beneath the door opening 20 and the door or closure 19 cooperating therewith. Thus, the spring 64 will by pulling down on the arm 63, open the door or closure 19 upon the latch plate or bolt 44 being released from the keeper 36 or from beneath the fender 21 at the edge of the opening 20 at the finger 49, upon the magnet being energized to disengage the catch finger 54 by retraction of the core or solenoid 39 and engagement of the outstanding shoulder or flange 40 with the beveled engaging edge 55 of the catch finger, which normally engages in one of the notches 50 to hold the lock in engaged position. Obviously, the plurality of notches 50 will permit the finger to move to a proper locking position, as well as to a releasing position upon the finger being disengaged, and insures that the bolt or latch plate 44 will be properly held in locking position when once engaged and the door or closure 19 is in position to close and cover the opening 20 over the filling neck 17 and cap 18 of the gasoline tank of the automobile. The release is instantaneous, without getting out of the seat of the automobile, especially in inclement weather, or otherwise and avoids the necessity of fumbling around with a key to unlock the usual locking cap. The device is of simple construction and therefore can be economically manufactured and installed as a boon to the automobile owner and driver in purchasing gasoline, as well as to the attendant at the gas station. Also, the plurality of notches or ratchet teeth 50 will permit the latch plate or bolt at the finger 49, to accommodate itself to cars of different makes wherein the fenders are shaped differently and the doors or closures such as 19 located in different relative positions, assisted by the fact of the adjustment of the housing or bracket 28 and the bracket 60 for mounting the same and attaching the opening spring. In addition, the fact that the latch plate or bolt 44 engages in the plane of its surface or edgewise, permits the same to be made relatively light in weight and gives considerable more strength, without flexing or bending, such as would occur if it depended upon the tensile strength thereof sideways or laterally in the direction of its thickness, where it would be likely to bend, and which is avoided by its edgewise engagement, thus serving to effectively prevent opening of the closure or door 19 of the fender once it is locked in closed position.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. A fender door lock for fenders having a door opening to expose the filling neck of a gas tank, a hinged door adapted to close said opening, spring means tending to swing the door upwardly to open position, a lock mounted on the underside of the door and including a notched latch plate disposed vertically on edge for rocking movement and having an engaging tongue for engagement with the fender adjacent the opening to hold the door in closed position, a spring-pressed catch acting on the latch plate to hold the same engaged and permitting release thereof upon opening of the door and automatic engagement of the same upon closing of the door, and electromagnetic means engageable with the catch to retract the same and disengage it from the latch plate to permit the door to open.

2. A fender door lock for fenders having a door opening to expose the filling neck of a gas tank, a hinged door adapted to close said opening, spring means tending to swing the door upwardly to open position, a lock mounted on the underside of the door and including a notched latch plate disposed vertically on edge for rocking movement and having an engaging tongue for engagement with the fender adjacent the opening to hold the door in closed position, a spring-pressed catch acting on the latch plate to hold the same engaged and permitting release thereof upon opening of the door and automatic engagement of the same upon closing of the door, said latch plate having ratchet notches engageable by the catch to positively hold said latch plate engaged until the catch is released and to frictionally hold the latch plate in released position, and electro-magnetic means for engagement with said catch to release the same from the notches, said electro-magnetic means including a solenoid having a movable core provided with an engaging end for rocking the finger in a plane at right angles to the latch plate, said core being attracted by energization of the electro-magnet and projected upon de-energization thereof, and a switch in circuit with a source of energy and said magnet for momentarily closing the circuit thereto at will.

3. A door lock of the class described comprising a wall having an opening therein, a door hinged to cooperate with and close said opening, a housing mounted beneath the door, a latch plate in the form of a disc mounted on said housing for vertical rocking movement on a horizontal axis and having a notch therein and a finger at one side of said notch, the other side of the notch adapted to engage the wall upon closing of the door to turn the latch and move the finger to locking engagement with said wall, the edge portion of the disc also having ratchet notches therein, a vertically pivoted horizontally rockable catch cooperating with said ratchet notches and normally held in engagement therewith within the housing, and electro-magnetic means for releasing said catch to permit release of the latch plate, said electro-magnetic means including a solenoid having a movable core retractable into engagement with the catch for releasing the same from the latch plate, and spring means tending to open said door.

4. A door lock of the class described comprising a wall having an opening therein, a door hinged to cooperate with and close said opening, a housing mounted beneath the door, a latch plate in the form of a disc mounted on said housing for vertical rocking movement on a horizontal axis and having a notch therein and a finger at one side of said notch, the other side of the notch adapted to engage the wall upon closing of the door to turn the latch and move the finger to locking engagement with said wall, the edge portion of the disc also having ratchet notches therein, a vertically pivoted horizontally rockable catch cooperating with said ratchet notches and normally held in engagement therewith within the housing, an electro-magnet including a coil connected in circuit with a source of energy, a switch in said circuit for controlling the coil of the electro-magnet, a movable core for said electro-magnet having an outstanding shoulder for engagement with the catch to release the same upon energization of the magnet, said catch positively holding said latch plate in locking position and frictionally holding it in the unlocked position to which it is moved upon opening of the door, said latch plate engaging with the wall for being moved to locking position upon closing of the door, a bracket carried by the housing and having an arm, and a spring between the arm and the wall for opening the door upon release of the latch.

HOMER M. STEELE.

REFERENCES CITED

The following references are of record in the file of this patent:

UNITED STATES PATENTS

| Number | Name | Date |
|---|---|---|
| 1,544,960 | Watts | July 7, 1925 |
| 1,676,515 | Anstey | July 10, 1928 |
| 2,035,895 | Kelly | Mar. 31, 1936 |
| 2,258,812 | Ross | Oct. 14, 1941 |
| 2,417,324 | Rivard et al. | Mar. 11, 1947 |